United States Patent [19]

Lebrun

[11] Patent Number: 4,997,359
[45] Date of Patent: Mar. 5, 1991

[54] MULTI-WELL DISH FOR CAPSULE MAKING

[75] Inventor: Jean C. Lebrun, Greenwood, S.C.

[73] Assignee: Warner-Lambert Company, Morris Plains, N.J.

[21] Appl. No.: 380,919

[22] Filed: Jul. 17, 1989

[51] Int. Cl.$^5$ .............................................. B29C 41/34
[52] U.S. Cl. .................... 425/269; 118/429; 366/272; 425/273; 425/804
[58] Field of Search ............. 366/136, 137, 159, 272; 425/269, 270, 273, 143, 804; 118/429

[56] References Cited

U.S. PATENT DOCUMENTS

| | | |
|---|---|---|
| 323,886 | 8/1885 | Reinhold ............................ 425/269 |
| 1,855,809 | 4/1932 | Sheppard et al. ................... 425/269 |
| 2,353,256 | 7/1944 | Maywald, Jr. ...................... 425/270 |
| 2,511,717 | 6/1950 | Killian ............................... 425/273 |
| 3,592,445 | 7/1971 | Whitecar ........................... 425/273 |
| 3,632,700 | 1/1972 | Oglevee ............................. 425/269 |
| 3,756,759 | 4/1973 | Weyers .............................. 425/270 |
| 4,521,365 | 6/1985 | Kurtz ................................. 425/269 |

FOREIGN PATENT DOCUMENTS 975436 11/1982 U.S.S.R. ............................. 425/273

*Primary Examiner*—James C. Housel
*Attorney, Agent, or Firm*—Daniel A. Scola, Jr.; Craig M. Bell; Richard S. Bullitt

[57] ABSTRACT

An apparatus for coating molds to make hard gelatin capsules has a dish for holding a bath of liquid gelatin. A multi-well tray is submerged in the bath to establish a plurality of fluid passageways through the bath and to create a pool of liquid gelatin in each of the wells. A drive unit, having a pair of counterrotating gears, moves gelatin through the passageways and pools to maintain a substantially uniform gelatin temperature throughout the bath. Capsule molds are periodically submerged into the pools and then withdrawn to manufacture the hard gelatin capsules.

14 Claims, 3 Drawing Sheets

MULTI-WELL DISH FOR CAPSULE MAKING

FIELD OF THE INVENTION

The present invention pertains generally to apparatus useful for the manufacture of items made of hard gelatin. More specifically, this invention relates to an apparatus for coating a plurality of molds with a gelatin, so that each mold is coated with a film of gelatin which is of a substantially uniform thickness. This invention is particularly, but not exclusively, suited for the manufacture of hard gelatin capsules.

BACKGROUND OF THE INVENTION

Hard gelatin capsules which may be used for packaging pharmaceutical medications are well known. Not so well known, however, are the difficulties which must be overcome to properly manufacture these capsules. For example, when literally thousands of capsules are manufactured each hour by a single machine, it is not surprising that a great amount of care must be taken to insure there is some degree of uniformity between capsules of the final product. Indeed, this is no small problem. Using presently available apparatus, the variation in weight of these capsules can be as much as thirty percent.

As is well known, typical procedures for manufacturing hard gelatin capsules involve momentarily submerging capsule mold pins in a relatively large liquid gelatin bath and then withdrawing the coated pins from the bath. The gelatin on the pins is then allowed to dry and the cast gelatin is subsequently removed from the mold pin to become an upper or lower half of a gelatin capsule. The efficacy of mold pins, however, is dependent on heat transfer between the pin and the gelatin bath. This is where presently available gelatin molding machines have some problems.

First, it is to be appreciated that before insertion of the mold pins into the gelatin bath, there is a temperature differential between the mold pins and the bath which is approximately between twenty-one and thirty-six degrees centigrade (21°-36° C.). This is so because the gelatin bath is typically maintained in a temperature range between forty-five to sixty degrees centigrade (45°-60° C.) whereas the mold pins are at room temperature, e.g. twenty four degrees centigrade (24° C.). This temperature differential is important as it promotes effective coating of the mold pin by the liquid gelatin. It also, however, affects the depth of the coating. Thus, for uniformity in coating, it is desirable there be consistently equivalent temperature differentials between each mold pin and the liquid gelatin bath into which it is dipped. Furthermore, this temperature differential should be constant and substantially equal not only for all of the mold pins which are simultaneously coated in one dip, it should remain so from dip to subsequent dip.

With presently available gelatin capsule molding devices, liquid gelatin is typically held in a dish having one large single well. Many mold pins, i.e. perhaps as many as one hundred fifty (150) or more, are simultaneously dipped into this well during each operational cycle. Consequently, due to the temperature differential and the resultant transfer of heat from the liquid gelatin bath to these mold pins, "cold spots" will remain in the gelatin bath when the pins are withdrawn. Unless these "cold spots" are effectively removed from the bath of liquid gelatin prior to the dipping of the next group of mold pins, the temperature differential between the mold pins and the liquid gelatin bath will have changed. Although a pumping mechanism may be used to move the gelatin within the bath to disperse these "cold spots", the largeness of the bath makes effective dispersal nearly impossible. One consequence of this will be that subsequently dipped mold pins will experience a different coating action which varies the film thickness of their coatings from those of previously dipped mold pins. This should be avoided.

The present invention recognizes that by using a plurality of smaller wells, rather than one large well, the liquid gelatin in each well can be completely replaced between dipping operations. The present invention also recognizes that a multi-well tray which is submerged in a bath of liquid gelatin can be used to establish a plurality of fluid passageways through which the gelatin can be moved to effectively disperse the "cold spots" which result from a mold dipping operation.

Accordingly, it is an object of the present invention to provide an apparatus for manufacturing hard gelatin capsules which uses a multi-well tray that effectively disperses the "cold spots" which occur when the mold pins are dipped into the gelatin bath. Another object of the present invention is to provide an apparatus for the manufacture of hard gelatin capsules which continuously influences a general pattern of gelatin flow to prevent the creation of eddies and fluid flow stagnation points that can adversely affect the coating of the mold pins with gelatin. Another object of the present invention is to provide an apparatus for the manufacture of hard gelatin capsules which maintains the entire gelatin bath at a substantially constant temperature by continuously circulating and mixing the gelatin. A further object of the present invention is to provide an apparatus for the manufacture of hard gelatin capsules having a plurality of wells in which the gelatin temperature in any well is substantially equal to the gelatin temperature in each of the other wells in order to equally coat all capsule forming mold pins to create uniformly thick capsules.

SUMMARY OF THE INVENTION

An apparatus for use in the manufacture of hard gelatin capsules comprises, in combination; a dish for holding a bath of liquid gelatin, a multi-well tray submerged in the bath to direct the flow of liquid gelatin in the dish, and a drive unit for moving and impelling the liquid gelatin through the tray.

The multi-well tray comprises a plurality of elongated narrow trough-like wells which are arranged in a spaced-apart side-by-side relationship with each other. Effectively, each well is formed by two substantially parallel opposing side walls and two opposed end walls which join the side walls to each other. Each side wall and each end wall has an upper edge and a lower edge, and a plurality of cross conduits extend from side wall to side wall. These cross conduits are open ended tubes which, in addition to supporting the walls of a well, establish an enclosed fluid flow passageway that extends from one side of the well to the other. Individual wells in the tray are connected together by plates which join the lower edge of a side wall of a well to the lower edge of the nearest side wall of an adjacent well. The drive unit of the apparatus comprises a pair of counter rotating gears which are submerged in the bath of liquid gelatin and are mounted in a housing under the multi-well tray.

In its operation, the drive unit of the apparatus is activated to counter rotate the gears in directions which draws liquid gelatin from the gelatin bath in the dish and impels it gelatin is then forced upward into each of the individual wells and is allowed to spill over the upper edges of the walls. After leaving the wells, the liquid gelatin spills either directly into the dish or into the spaces between the wells. Liquid gelatin which spills into the spaces between the wells flows back into the dish directly from these spaces or subsequently after passing through the cross conduits.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
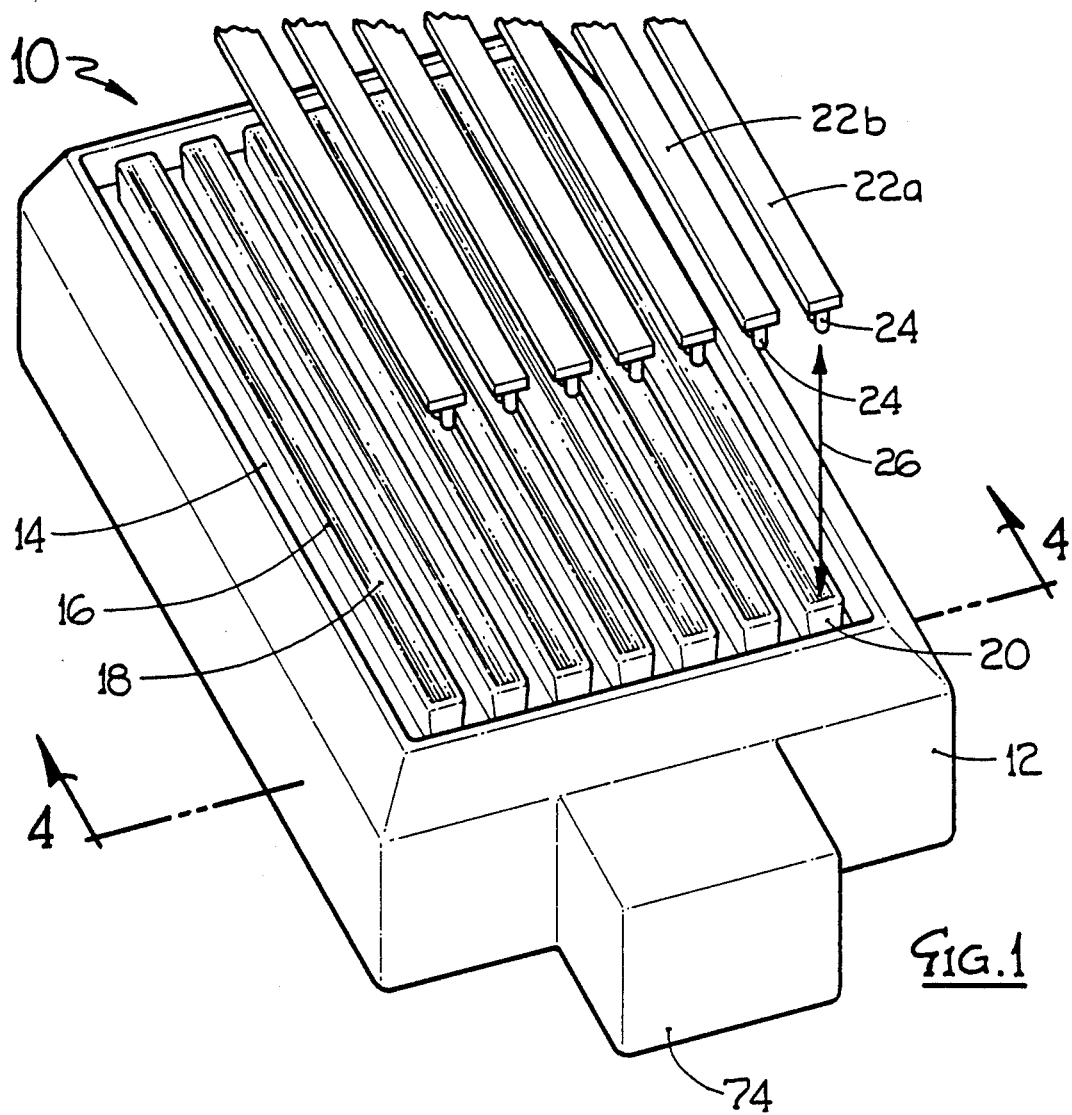
FIG. 1 is a perspective view of a gelatin filled multi-well dish and a pin rack prior to submersing the pins into the gelatin.

Referring initially to FIG. 1, an apparatus for the manufacture of hard gelatin capsules is shown and generally designated 10. As shown, it is to be appreciated that apparatus 10 comprises a dish 12 which holds a volume or bath 14 of liquid gelatin. In accordance with the present invention the liquid gelatin is prepared using well known formulas and may be colored as desired using well known ingestible dyes. A multi-well tray 16 is submerged in bath 14 to create individual pools 18 of gelatin within each well 20 of tray 16 for purposes to be subsequently discussed in detail. With the wells 20 arranged in a side-by-side relationship, a plurality of mold bars 22 are aligned substantially as shown in FIG. 1 so that the plurality of mold pins 24 attached to each mold bar 22 can be correspondingly dipped into a respective pool 18. As suggested in FIG. 1, this is accomplished by movement of the mold bars 22 and their respective mold pins 24 in the directions indicated by arrows 26.

Figure 2:
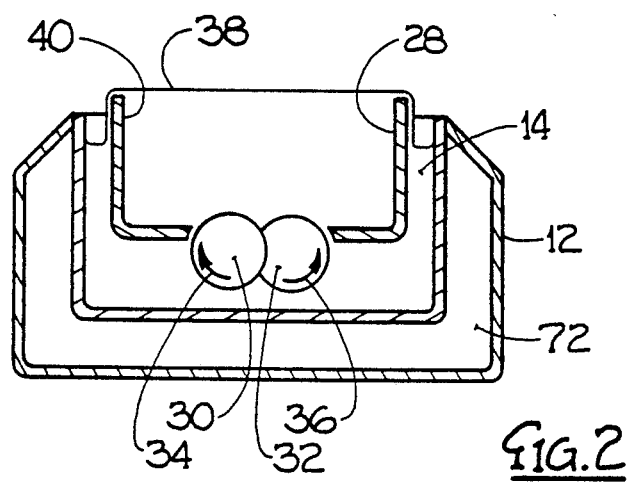
FIG. 2 is a cross-sectional view of a gelatin dish using a single well.

An initial appreciation of the major components of an apparatus 10 useful for the manufacture of hard gelatin capsules can perhaps be best appreciated by reference to FIG. 2 wherein the preferred embodiment is shown with the multi-well tray removed and a single well tray 28 submerged in the gelatin bath 14 that is held by dish 12. In FIG. 2, it is shown that a pair of gears 30, 32 are mounted on the bottom of single well tray 28 for counterrotation in the directions respectively indicated by arrows 34, 36. With this configuration, liquid gelatin from bath 14 is pumped by the gears 30, 32 into single well tray 28 to create a pool 38 of moving liquid gelatin which overflows lip 40 of tray 28 and flows back into bath 14. Such a configuration is typical for a single well gelatin dish and accordingly suffers from the drawbacks set forth above. Specifically, pool 38 is so large that any dispersing movement of gelatin within the pool 38 between successive dipping operations is operationally ineffective.

Figure 3:
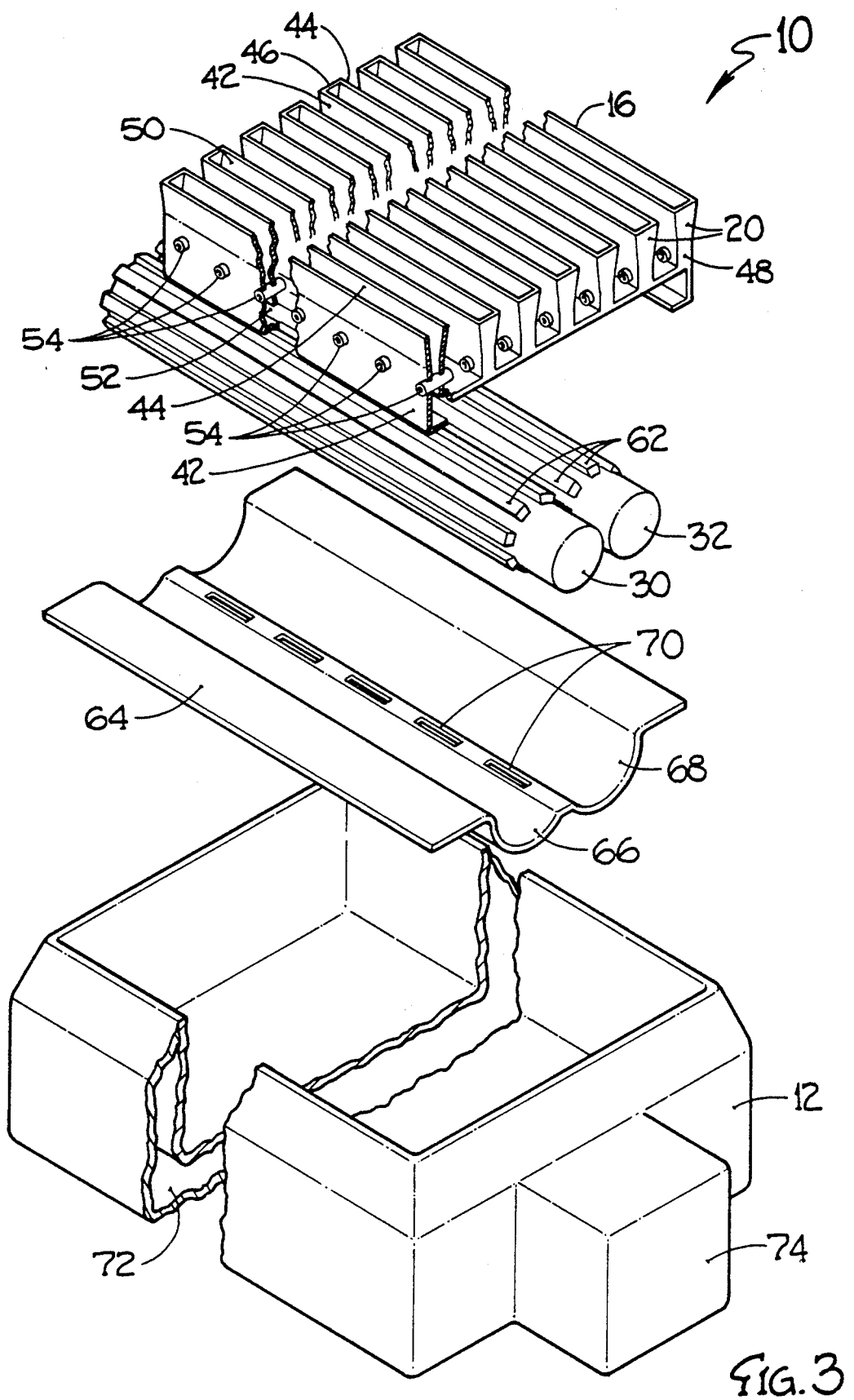
FIG. 3 is an exploded perspective view of the gelatin dish and multi-well tray with portions shown in cross section for clarity.
Figure 4:
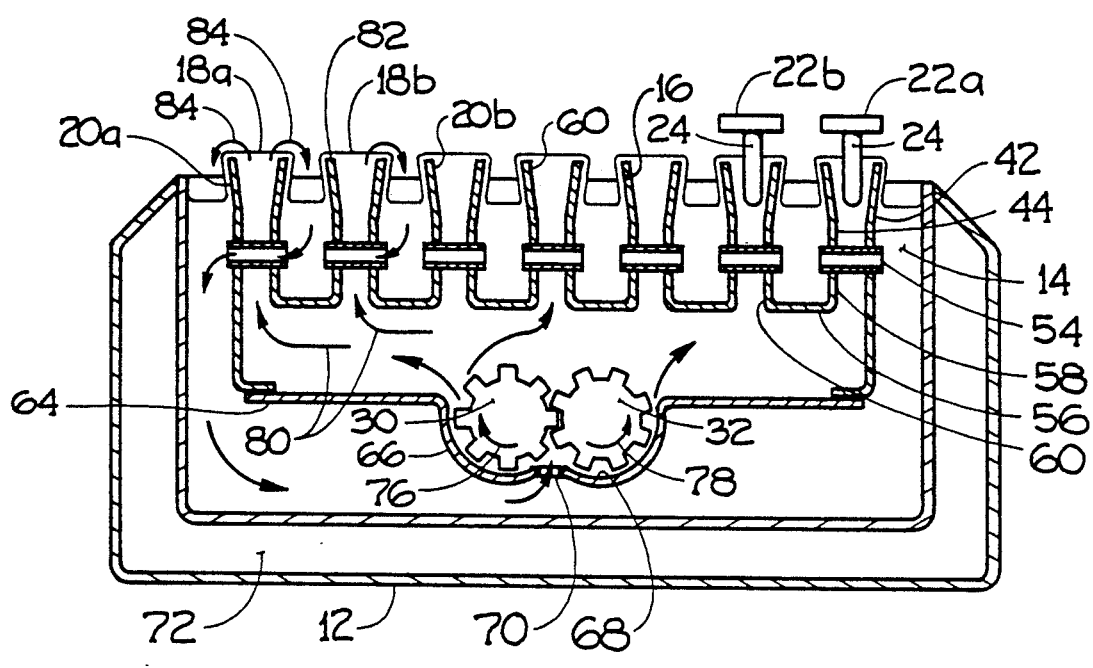
FIG. 4 is a cross-sectional view of the multi-well dish as seen along the line 4-4 in FIG. 1.

Apparatus 10 of the present invention as shown in FIG. 3, overcomes the drawbacks of the single well tray 28 configuration shown in FIG. 2. Specifically, multi-well tray 16 comprises a plurality of elongated narrow trough-like wells 20 which are arranged in a spaced-apart side-by-side relationship substantially as shown. As best seen in FIG. 3, each well 20 is formed by a pair of side walls 42, 44 which are substantially parallel and opposed to each other. Further, sidewalls 42, 44 of each well 20 are held in their spaced-apart relationship by end walls 46, 48 as shown in FIG. 3. Importantly, each well 20 has an open top 50 and an open bottom 52. Additionally, within each well 20 a plurality of cross conduits 54 extend between the side walls 42, 44. As shown in FIG. 3 and FIG. 4, each cross conduit 54 is essentially a cylindrical open-ended tube which establishes an enclosed fluid communication passageway through well 20 from the outside of wall 42 to the outside of wall 44. Additionally, cross conduits 54 provide some stability and support for the side walls 42, 44. Interestingly, if one pin 24 would dip into pool 18 directly over one conduit 54 and another pin 24 would dip between two conduits 54, the gelatin flow around these two pins 24 would be different and this would lead to different capsule weights. Conduits 54 can be properly located relative to pins 24 to create an equal gelatin flow around each pin 24. Also, as shown in both FIG. 3 and FIG. 4, the individual wells 20 of multi-well tray 16 are connected together by plates 56 which, for example, connect the lower edge 58 of a side wall 44 of a well 20 with the nearest lower edge 60 of a side wall of an adjacent well 20.

FIG. 3 also shows that apparatus 10 includes drive gears 30 and 32 which are meshingly juxtaposed beneath multi-well tray 16. It will be appreciated by the skilled artisan that the gears 30 and 32 can either be helical (not shown) or have linearly aligned teeth 62 substantially as shown. A support plate 64 is formed with parallel nests 66, 68 and is attached to the underneath side of multi-well tray 16 substantially as shown in FIG. 4. A line of holes 70 are formed on support plate 64 between nests 66, 68 to be positioned between gears 30, 32 when gears 30, 32 are mounted on apparatus 10 between multi-well tray 16 and support plate 64 as shown in FIG. 4.

As seen in FIG. 2, FIG. 3 and FIG. 4, dish 12 is formed with a water jacket 72 which is used to heat liquid gelatin in dish 12 and maintain its temperature within a predetermined range. A housing 74 is mounted on dish 12 for holding a motorized drive unit (not shown) which engages and rotates the gears 30, 32.

OPERATION

The operation of apparatus 10 will be best appreciated by referring to FIG. 4. There it will be seen that dish 12 provides a basin for holding a bath 14 of liquid gelatin. Submerged in bath 14 is the multi-well tray 16 which establishes a plurality of fluid passageways through bath 14. Importantly, multi-well tray 16 also establishes a plurality of relatively small pools 18a, 18b et. seq. into each of which the mold pins 24 on a separate corresponding mold bar 22 can be dipped. After being dipped into their respective pools 18 and coated with a film of gelatin, the mold pins 24 are withdrawn and the gelatin is allowed to harden on the pins 24 to form either an upper cap or a lower half body of a gelatin capsule. As mentioned above, due to the temperature differential between the mold pins 24 and the gelatin bath 14, "cold spots" will be left in the liquid gelatin after withdrawal of mold pins 24.

In accordance with the present invention, the "cold spots" which are created when mold pins 24 are dipped into pools 18 are dissipated by the replacement of gelatin within the pools 18. Specifically, gelatin flow within the multi-well tray 16, and consequently through pools 18, is caused by the action of counterrotating gears 30, 32. As shown in FIG. 4, gear 30 rotates in the direction indicated by arrow 76 and gear 32 rotates in the direction indicated by arrow 78. This rotation of gears 30, 32 draws gelatin into the nests 66, 68 through holes 70 and impels the gelatin toward the underneath side of multi-well tray 16 as indicated by the arrows 80. As a result, gelatin is being continuously forced into the individual wells 20. Consequently, pools 18 are replenished and as these pools 18 fill to their brim 82, the gelatin is allowed to spill back into bath 14 as indicated by the arrows 84. In the contemplation of the present invention, any gelatin which has been cooled by mold pins 24 and left in pool 18 after withdrawal of pins 24 therefrom will be forced out of pool 18 and into bath 14 before the next dipping operation. More specifically, after leaving pool 18 the gelatin can proceed through bath 14 by various passageways, to include passage through cross conduits 54, before it is again drawn through holes 70 by gears 30, 32 and again forced upward into the pools 18 formed by wells 20. During this progression, the temperature of the gelatin within bath 14 is equalized to ensure the promotion of uniform coating of mold pins 24 by stabilizing the temperature differential between mold pins 24 and the gelatin temperature in the pools 18.

While the particular multi-well dish as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. An apparatus for use in the manufacture of hard gelatin capsules which comprises:
    a dish for holding liquid gelatin;
    a disperser tray having a plurality of wells arranged in a spaced apart relationship, said trap submerged in said liquid gelatin to direct said liquid gelatin through said dish along predetermined paths; and
    a drive unit mounted on said dish for impelling said liquid gelatin through said disperser to maintain a substantially uniform temperature throughout said liquid gelatin.

2. An apparatus for use in the manufacture of hard gelatin capsules as recited in claim 1 wherein each of said wells comprises two substantially parallel opposing side walls joined together by two opposing end walls to define and interior.

3. An apparatus for use in the manufacture of hard gelatin capsules as recited in claim 2 further comprising a plurality of hollow cylindrical-shaped conduits extending between said side walls of each well to establish a fluid flow passageway therethrough.

4. An apparatus for use in the manufacture of hard gelatin capsules are recited in claim 1 wherein said drive unit comprises a pair of counterrotating gears mounted on said disperser tray.

5. An apparatus for use in the manufacture of hard gelatin capsules as recited in claim 4 wherein said drive unit impels said fluid gelatin toward said disperser tray.

6. An apparatus for use in the manufacture of hard gelatin capsules as recited in claim 1 further comprising a heater attached to said dish for warming said liquid gelatin.

7. An apparatus for use in the manufacture of hard gelatin capsules as recited in claim 1 further comprising a water jacket positioned in a surrounding relationship with said dish to stabilize the temperature of said liquid gelatin in said dish.

8. An apparatus for use with capsule molds in the manufacture of hard gelatin capsules which comprises:
    means for holding a bath of liquid gelatin;
    a tray having a plurality of wells arranged in a spaced apart relationship, said tray being submersible in said bath to establish a plurality of fluid passageways therethrough, each of said passageways creating a pool of gelatin for respectively receiving a corresponding mold to coat said mold with gelatin; and
    means for circulating said liquid gelatin in said bath through said submersible tray.

9. An apparatus for use with capsule molds in the manufacture of hard gelatin capsules as recited in claim 8 wherein each of said wells comprises two substantially parallel opposing side walls joined together by two opposing end walls to define an interior.

10. An apparatus for use with capsule molds in the manufacture of hard gelatin capsules as recited in claim 9 further comprising a plurality of hollow cylindrical-shaped conduits extending between said side walls of each well to establish a fluid flow passageway therethrough.

11. An apparatus for use with capsule molds in the manufacture of hard gelatin capsules as recited in claim 8 wherein said holding means is a dish.

12. An apparatus for use with capsule molds in the manufacture of hard gelatin capsules as recited in claim 11 further comprising a water jacket positioned in a surrounding relationship with said dish to stabilize the temperature of said liquid gelatin in said dish.

13. An apparatus for use with capsule molds in the manufacture of hard gelatin capsules as recited in claim 11 wherein said circulating means comprises a pair of counterrotatable gears mounted beneath said passageways, said gears rotated by a motorized drive unit mounted on said dish.

14. An apparatus for use with capsule molds in the manufacture of hard gelatin capsules as recited in claim 11 further comprising a heater attached to said dish for warming said liquid gelatin.

* * * * *